June 2, 1970        J. L. WEST        3,514,811

FISH ORIENTER

Filed Oct. 30, 1968        2 Sheets-Sheet 1

INVENTOR
JEFFERY L. WEST

BY Ernest S. Cohen
Gersten Sadowsky
ATTORNEYS

June 2, 1970 J. L. WEST 3,514,811
FISH ORIENTER
Filed Oct. 30, 1968 2 Sheets-Sheet 2
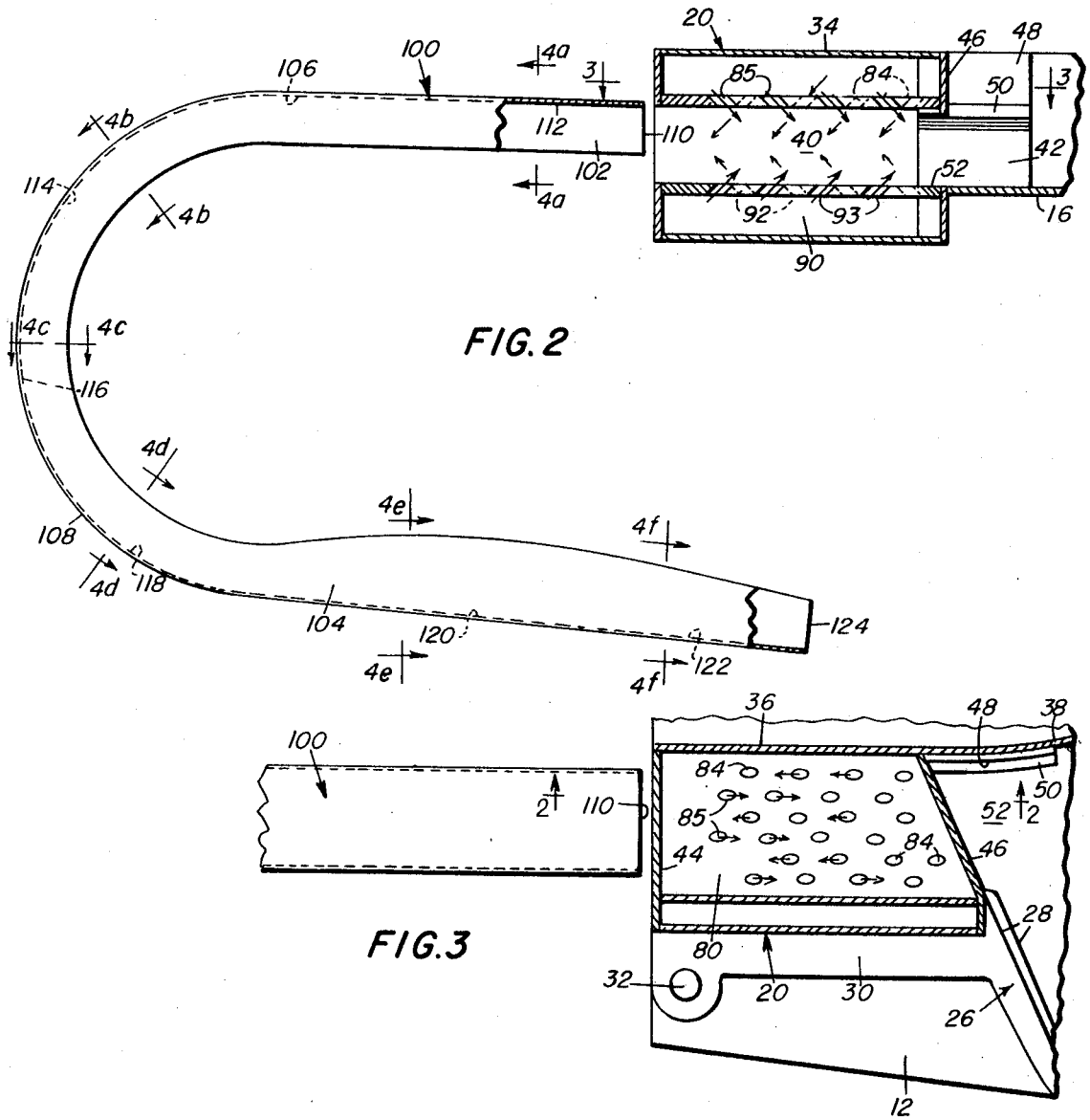
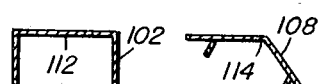 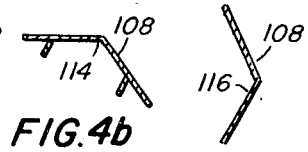 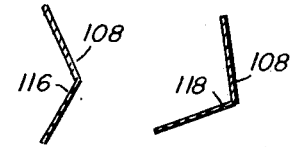 
INVENTOR
JEFFERY L. WEST
BY
ATTORNEYS

United States Patent Office 3,514,811
Patented June 2, 1970

3,514,811
FISH ORIENTER
Jeffery L. West, Winchester, Mass., assignor to the United States of America as represented by the Secretary of the Interior
Filed Oct. 30, 1968, Ser. No. 771,792
Int. Cl. A22c 25/08, 25/12
U.S. Cl. 17—55                                                7 Claims

ABSTRACT OF THE DISCLOSURE

Apparatus singulating, uniformly heading and orienting the dorsal side of fish in which fluid jetting devices are arranged for cooperation with structure contoured to guide and divert the fish. Jetted fluid produces a circulation stream in which randomly placed fish are urged into a single file and then carried forward to strike a surface deflecting the fish into a jet mechanism wherefrom head-first fish are ejected, and tail-first fish are rejected to the circulation stream. Ejected fish are further propelled into a partially semi-circular channel which is contoured to guide singulated, uniformly headed fish it receives into turning to a uniform dorsal side disposition for feeding to further fish processing machinery.

---

This invention resulted from work done for the U.S. Government under Contract Nos. 14–17–0007–338 and '611 with the Bureau of Commercial Fisheries, Fish and Wildlife Service of the Department of the Interior, and domestic title to the invention is in the Government.

The invention relates to apparatus for handling objects having generally corresponding irregular shapes to change a random disposition of these objects into a relatively uniform arrangement of them. As disclosed herein the apparatus operates to condition species of fish having either gills or scale pockets, or both, such that these fish may be fed to further processing equipment, including eviscerating, subdividing and canning machinery, in a specific orientation and sequence. Hydraulic forces produced in the apparatus are applied to act on the fish in conjunction with a sequence of directional constraints on them effectuated by a unique arrangement of diverting surfaces comprising the apparatus. The fish are thereby singulated, automatically headed to assume a predetermined direction wherein they are longitudinally oriented with their dorsal sides uniformly disposed as required for properly feeding them to the aforesaid further processing equipment.

Fish processing machinery have heretofore been equipped with feeder apparatus wherein fish are headed and longitudinally oriented and thereafter positioned by operation of vibratory devices including rectangular and grooved trays which vibrate longitudinally, and semi-circular disc arrangements which oscillate about central pivots. Operation of such devices do not provide an inherent singulation function since fish must pass upon a surface where they may jam. Other undesirable characteristics of such devices are high initial cost, great weight, size and complexity, and excessive noise of operation. Apparatus according to the present invention utilizes arrangements of jets producing forceful streams of water which propel the fish in a predetermined manner within the confines of deflecting walls and channels. The fish are thus guided to traverse paths through the apparatus wherein the fish are singulated, and oriented to assume a predetermined disposition with respect to the inlet of processing machinery. Moreover, since the jets operate to direct opposing streams of water at the fish whereby they are in a swirl which effectively suspends them away from adjacent surfaces, the fish move rapidly and without injury to their substances. The apparatus is essentially free of moving parts such as corner belts, driven guides or links or other displaceable components. It is therefore relatively low cost, light in weight, and it is operable with a minimum of noise.

An object of the present invention is therefore to provide for fish processing machinery a feeder apparatus in which the fish are separately aligned, headed, and uniformly positioned.

The invention will be further explained with reference to the embodiment of the invention illustrated by way of example in the accompanying drawing, wherein:

FIG. 2 is a partly sectional fragmentary view of the feeder end structure of the apparatus;

FIG. 3 is a partial, and further sectional view of the aforesaid feeder and structure taken along line 3—3 in FIG. 2; and FIGS. 4a to 4f are isolated cross-sectional illustrations of the gradually changing form taken by a dorsal orienter implement of the apparatus, corresponding to cuts A—A to F—F across this implement as shown in FIG. 2.

Figure 1:
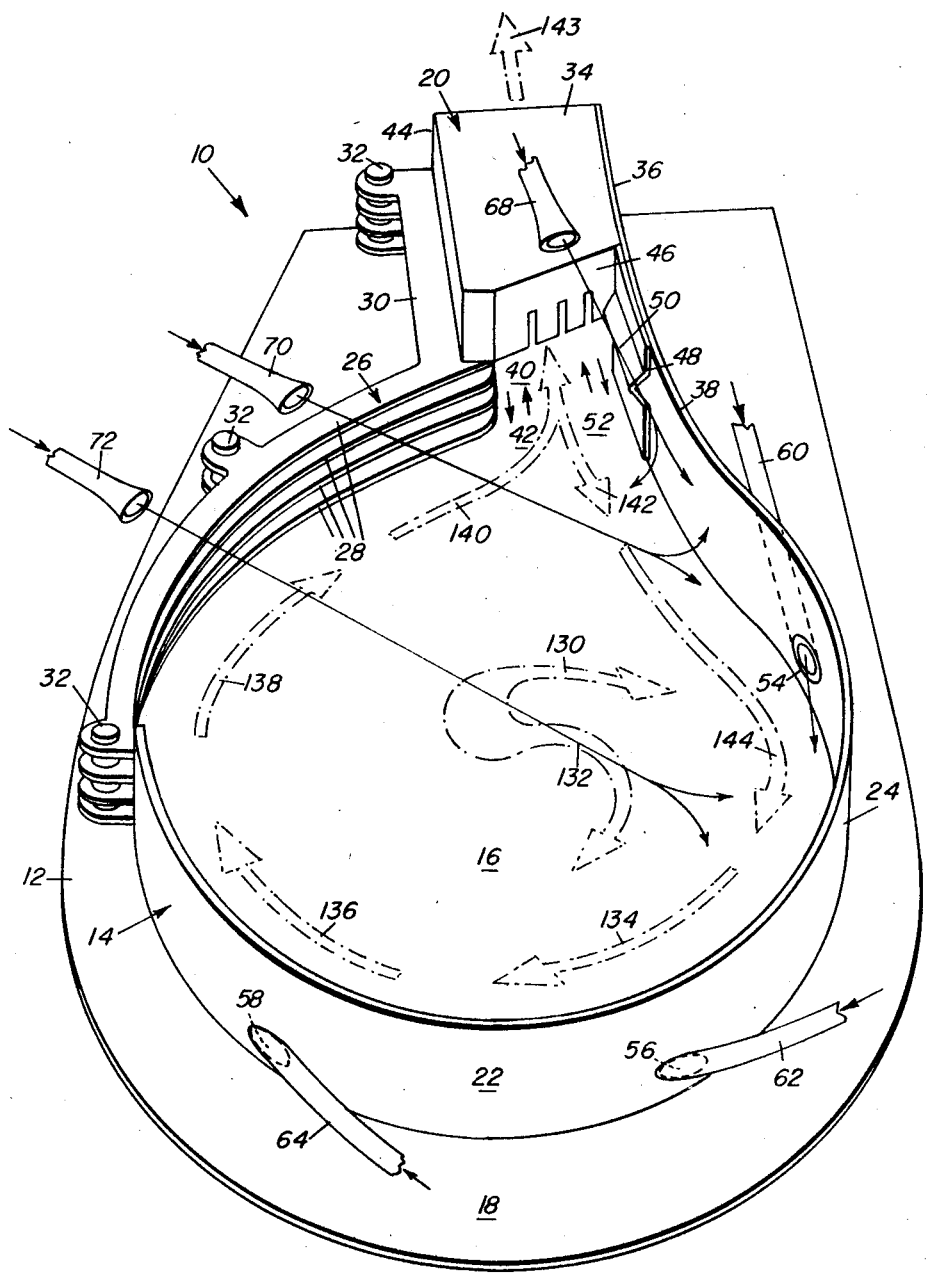
FIG. 1 is a generally overhead perspective view of apparatus according to the invention.

The representative embodiment of the invention appearing in FIG. 1 is characterized by a relatively broad deck-like construction 10, of which a plate 12 serves as a platform under a structure fashioned as a tray-like enclosure 14. The larger part of plate 12, which is within the bounds of a semi-circular contour, furnishes a bottom surface or floor 16 inside of enclosure 14, and a wide flange 18 outside of the enclosure. The further part of plate 12 bordered by straight sides provides a base under a feeder mechanism 20 which cooperates with enclosure 14 as an integral part thereof. A roughly circular wall 22 defining the area encompassed within enclosure 14, is formed by a wide band of solid material constituting a curved segment 24, and a somewhat shorter open grille section 26 having about half the height of solid segment 24. Open grille section 26 includes a plurality of narrow, flat arcuate elements 28 having straight edged end portions 30. These elements are maintained evenly spaced on vertical pins 32 fixed in plate 12.

Feeder mechanism 20 appears in FIG. 1 as comprising a relatively low housing 34 supported on one side by overlying a straight portion 30 of uppermost grille element 28, and on the side opposite thereto by attachment to an upper part of the inner surface of a straight wall segment 36. A short curved wall segment 38 facilitates the blending of wall segment 36 with the circular configuration of enclosure wall 22. Straight grille portions 30 are disposed parallel to the lower half of the inner surface of straight wall segment 36, and spaced therefrom so as to form a generally rectangular and straight passage 40 under housing 34. Passage 40 connects an opening 42, facing the area bounded by enclosure 14, to an opening in an outside end wall 44 of feeder 20. Opening 42 rises to the lower edge of the housing's inner end wall 46 which is in the plane of grille 26 such that the opening is angularly disposed at roughly 60 degrees to the centerline of passage 40. The opening of passage 40 in outside end wall 44 is disposed therewith in a plane perpendicular to the centerline of the passage. Wall extension 36 carries attached thereto a rectangular plate 48 having a singular rib-like protrusion 50 formed across its middle such that it is effectively aligned with the upper edge of opening 42, and parallel to a path 52 providing access to passage 40 from floor 16 of enclosure 14.

Three holes 54, 56, and 48, located evenly spaced apart along the peripheral length of wall 24, and adjacent to the edge thereof attached to base plate 12, provide elliptical openings for receiving suitable sealing washers which are fitted to facilitate water-tight connections retaining three hoses 60, 62, and 64, respectively, entering wall 24 from without enclosure 14, approximately tangentially. Additionally provided for operative association with the aforesaid hoses, in a manner to be hereinafter more fully explained, are a jet device 68 stationed atop housing 34 and directed to apply its stream upon that part of wall 24 lying between plate 24 and hole 54, and jet devices 70 and 72, which are arranged to be supported by suitable clamps (not shown), whereby they extend over grille 26, wherefore jets are set to direct streams upon the enclosure's floor 16 adjacent to wall 24 between wall segment 38 and hole 54, and slightly beyond the center of the enclosure, respectively.

Now referring to FIGS. 2 and 3 for a disclosure of the elemental construction of feeder mechanism 20, its housing 34 is seen as a relatively narrow chamber closed underneath by a perforated plate 80 which separates the housing from passage 40. The perforations provide round holes 84 and 85 extending through the thickness of plate 80 at approximately 30 degrees thereto. From the inside view of plate 80 given by FIG. 3, its holes are revealed as set out in six rows of four holes each. The generally staggered arrangement of these holes facilitates making adjacent rows of holes head in opposite directions. Thus, the arrows applied in FIGS. 2 and 3, to manifest the alternating headings of water stream adapted to jet from holes 84 and 85, as will be explained more fully later, correspondingly indicate the changing headings of the rows of holes.

Feeder passage 40 is further defined by a bottom surface 88 provided by the closure over the top of a lower housing 90 comprising the feeder. Surface 88 is joined to enclosure floor 16 by way of path 52. Perforations passing through the closure of housing 90 provide round holes 92 and 93, also disposed at approximately 30 degrees, which communicate the chamber of the housing with passage 40. These holes are set out in six rows of four holes each such that the separate openings in surface 88 are located directly under the respective openings of holes 84 and 85 in plate 80. Further, the headings of the holes in alternate rows on surface 88 are oppositely directed to correspond these holes to a mirror image of the holes passing through plate 80. Accordingly, any two vertically aligned holes are disposed to direct their jets to approximately the same area in a median plane extending horizontally through passage 40. It should be evident that where desirable for more effective operation, jet devices having appropriate nozzle ends can be fitted into holes 84, 85, 92 and 93. Water under pressure is fed to housings 34 and 90 by conventional hose connections thereto whereby these housings function as manifolds for the holes therein.

Consideration of FIG. 2 in connection with FIG. 4 will make evident a unique cooperation between feeder mechanism 20 and a diversionary channel 100, which functions as a centrifugal dorsal orienter for fish supplied thereto by the feeder. Channel 100 has a generally parabolic form which when effectively disposed places an upper leg 102 thereof directly over its lower leg 104. A downward path 106 extending through straight channel legs 102 and 104 is completed by way of an intermediate roughly semi-circular channel part 108. All of channel 100 is open to face inwardly toward the axis of its curvature. An upper end opening 110 of channel 100, situated contiguous to the outside end opening of feeder passage 40, leads to a definitive surface 112 of channel path 106 which provides a continuing passage for fish leaving the feeder passage. Exemplary feeder outside end opening sizes were determined to fall within a range where width is 10 to 50 percent wider than a fish height, and height is 10 to 50 percent higher than a fish thickness. Surface 112, across which fish are initially projected, is substantially flat, as appears in the A—A cross-sectional showing of FIG. 4a, and an exemplary width therefor is slightly wider than a fish height. The surface of path 106 thereafter blends into a shallow V shape, as indicated by surface 114 in the cross-sectional view of FIG. 4b. An exemplary width for surface 114 is approximately one and a half times a fish height. Further developments of channel path surface 106 following around channel part 108, are indicated by the deeper V surfaces 116 and 118 appearing in the cross-sectional views of FIGS. 4c and 4d. The terminal portions of path 106, carried by channel part 104, gradually develop into a relatively broad curved surface 120 which quickly converges to form a relatively narrow U shape surface 122, as delineated in the cross-sectional views of FIGS. 4e and 4f. An exemplary width for surface 122 is slightly wider than a fish thickness. The lower arm of channel 100 terminates with an end opening 124 through which the dorsal oriented fish emerges as input for further processing machinery.

The apparatus heretofore described is adapted to receive within its enclosure 14 a steady stream of fish upon which the apparatus acts to orient them longitudinally and in a head-first direction, and eject the fish singly in a prescribed dorsal oriented disposition. The fish loaded into this apparatus are of a specie having gill covers or scale pockets, or both, and they are ordinarily pre-graded according to thickness. Water under pressure is fed to all jet facilities of the apparatus including hoses 60, 62, and 64, devices 68, 70, and 72, and the chambers enclosed by upper and lower housings 34 and 90 of feeder mechanism 20, as was hereinbefore explained.

Fish are normally introduced to enclosure 14 in a random manner so as to drop on a central area of the enclosure's floor 16. Jet device 72 constitutes a scavenging jet which applies a forceful stream of water across the aforesaid central area of floor 16, whereby fish placed thereon are pushed toward the periphery of enclosure 14 adjacent wall segment 24, as indicated by arrows 130 and 132 in FIG. 1. The fish thus displaced are picked up by the steady stream of water directed upon the enclosure wall from circulation jets issuing from hoses 60, 62 and 64, through openings 54, 56, and 58, respectively. The fish thus caught up in this circulation jet flow are caused to accelerate along a path, depicted in FIG. 1 by arrows 134, 136, 138 and 140, which follows the contour of wall 24. As the fish nears path 52 adjacent to feeder opening 42, excess stagnating water moving with the fish is strained out through elements 28 of grille 26. The fish arrives upon path 52 at relatively high speed and impacts plate 48 on far wall 36. Possible upward travel of the impacting fish is limited by the contoured surface of rib 50 which deflects the fish downward to retain its alignment with opening 42. Because of the angle of incidence of the path in which the fish travels, the impacting end of the fish slides along plate 48 toward feeder passage opening 42. In essence, the body of the fish flattens along the plate since the center of gravity of the fish traveled in a straight line thereto.

Any fish traveling head first into passage 40 is carried through the passage by the force of water jetting from holes 84 and 92 directed toward the passage opening in end wall 44 and reacting under the gill covers and in the scale pockets of the fish. Water jetting from holes 85 and 93 aimed from passage 40 back to path 52 cause little resisting force because of the streamlined shape of the body and tail of the fish. Any fish traveling tail first into passage 40 is accelerated back upon enclosure floor 16 by the force of water jetting from holes 85 and 93 directed toward passage opening 42, and reacting against the gill covers and scale pockets of the fish. Oppositely jetting water from holes 84 and 92 have little effect on the fish, as was hereinbefore explained. Upon moving away from path 52, the rejected fish is struck by a cross-stream from jet device 70, and is deflected against and further accelerated along the contour of wall 24, as indicated by arrows 142 and 144 shown in FIG. 1. Circulation jets from wall openings 54, 56 and 58, still further accelerate the fish and the aforesaid fish impelling cycle is repeated. It is to be noted that the fish which has been turned around in the process of rejection from passage 40, travels in the further cycle back to path 52 in a head-first direction.

Automatic processing of fish as was hereinabove described results in a string of single fish being directed head first from the feeder opening in end wall 44 and into opening 110 at the upper end of channel 100. Singulated fish entering channel 100 are passed into channel leg 102 at a relatively high velocity whereby they are caused to slide along the flat upper surface 112 of this leg. As the fish continues along channel path 106 it encounters surface 114, characterized by a V section of approximately 120 degrees included angle, along the vertical arc traceable through channel part 108. Since the center of gravity of the fish is normally closer to the dorsal than the belly side centrifugal force tends to cause the dorsal side of the fish to seek the deepest point in the V. Therefore combined forward and lateral thrusts on the fish start it to rotate longitudinally toward a dorsal down orientation. Near the end of the vertical turn, the cross-section gradually and uniformly changes from a V to a U shape. This gradual change, reflected by the shape of surface 120, applies a gentle force on the belly of the fish to gradually complete its rotation to a dorsal down orientation without jarring the whole fish away from the centerline of path 106. Extension of the U shaped lower leg 104, as shown in FIG. 2, serves to hold the dorsal orientation while the fish is carried on surface 122 toward opening 124 of the channel.

Smooth transition of a fish from feeder 20 to channel 100 is enhanced by maintaining equal force in the facing, opposite water jets in passage 40 since such jets suspend the fish in a water film and avoid the frictional drag of the fish on solid surfaces. A similar phenomenon arises when the use of a stripper jet from device 68 is augmented by jets from devices 70 and 72, which carom off the enclosure floor surface 16 and wall 24, whereby water films are provided between fish and solid surfaces. In addition, the circulation jets from openings in wall 24, are directed to skim floor surface 16, such that these jets tend to carry the fish along chord lines rather than against the wall.

A further advantage of the apparatus disclosed arises from having front opening 42 of passage 40 within the plane of grille 26, and thus essentially in the path of the fish. Since the end of the fish enters opening 42 only after impacting upon and being deflected by the solid plate 48 at the far side of the opening, a second fish following too closely will strike the body of the preceding fish rather than the wall. Although the end of the second fish may also tend to slide in the same direction as the end of the first fish, the end will strike elements 28 of the grille instead of entering opening 42. The resulting rotational motion puts the fish under the influence of the rejection and cross jets and sends it back around the tray. Where the opening to the exit passage would be situated directly in the path of the fish, the possibility would exist of relatively small ends of two fish being driven simultaneously into this opening and become tightly jammed. Serious jamming is also avoided in the apparatus by suitably unbalancing jet forces acting about the entrance 42 to exit passage 40. This unbalanced condition is effectuated by causing the fish rejection jets from holes 85 and 93 to be stronger than the fish ejection jets from holes 84 and 92. A fish carried across path 52 and impacted on plate 48, starts to enter opening 42 by virtue of its kinetic energy. Therefore a fish approaching opening 42 at too slow a speed to be properly positioned is cleared away by rejection jets before it enters the opening, and is sent around for processing once again.

The apparatus such as heretofore described can also be arranged to create a double ended hydraulic swirl fish orienter wherein fish accepted in a random manner are oriented longitudinally and in a head first direction and ejected singly and alternately from two exit passages in a prescribed path. This is accomplished by bringing together two identical sections back to back of essentially the exit end of the single ended apparatus generally shown in FIG. 1, whereby the resulting apparatus has two exits pointing in opposite directions. By this construction, a rejected fish need move only 180 degrees around the tray-like enclosure to reach an exit, rather than 360 degrees as in the single ended apparatus. Suitable restricting structures, such as doors placed across the respective exit passages, which can be selectively opened and closed automatically by remote controlled conventional relay plunger devices or the like, adapts the double ended apparatus to discharge fish from each exit in whatever sequence is desired. This arrangement is of importance to sardine processing where withdrawal of a fish alternately from one exit and then the other has the advantage that the fish may then be brought together at subsequent processing and packing stations in a required alternated orientation ready for packing. However, a doubled ended apparatus can also substantially double the rate at which an orienter is effective to manipulate fish, and moreover use less water per fish since less circulation jets are applied to maintain the fish at a requisite velocity around only 180 degrees of the enclosure.

While a preferred form of the physical embodiment of the invention has been illustrated and described herein, it is understood that the invention is not limited thereby, but is susceptible to change in form and detail.

What is claimed is:

1. Apparatus for uniformly orienting randomly conveyed fish received therein, said apparatus comprising in combination with means facilitating a predetermined displacement of a file of longitudinally disposed, separated fish, said facilitating means including confining elements temporarily containing said fish and a fluid supplied thereto, said confining elements having mounted in separated areas thereon fluid dispensing jets spurting fluid impinging upon other areas of said confining elements, and further include surfaces deflecting confined fluid carrying said fish caught up therein and displacing the fish therewith toward a deflector element having a substantially vertical surface; fish impelling means comprising a passage therethrough having mechanism therein to produce first and second sets of jet streams of fluid aimed toward oppositely facing first and second vertically disposed openings of said passage, respectively, said vertical deflector surface being contiguous to said first opening of said passage, said first opening being situated in a vertical plane angled toward said vertical deflector surface such as to define less than a right angle therebetween, whereby fish being displaced impacts on said deflector surface and rebounds therefrom into said passage, and an elongated conduit structure having a substantial arcuate section and being characterized by an irregularly contoured internal path, said conduit structure being disposed adjacent to said second passage opening, said first set of jet streams acting upon any rebounding fish entering tail-first into said passage to redirect said fish out of said passage and into fluid jetted within said facilitating means, said second set of jet streams acting upon any fish rebounding from said deflector surface entering head first into said passage to further impel said fish out of said second passage opening at a substantial velocity and into said conduit structure whereby said head first fish traverses the length of said contoured internal path whereon the fish is turned about its longitudinal axis to obtain a predetermined orientation of its dorsal side.

2. Apparatus for uniformly orienting a succession of substantially similar irregular bodies fed thereto in a uniform manner and at a substantial speed, said apparatus comprising an elongated conduit structure having substantially linear upper and lower parts, and an intermediate curved part smoothly joining said upper and lower parts to form an integral internal path extending along the length of said conduit structure, said upper part internal path having a partially rectangular cross-section merging into substantially V-shaped cross-sections, said intermediate part internal path having relatively deeper V shaped cross-sections following from said upper part internal path, and merging with a relatively wide, rounded shaped cross-section defining a section of said lower part internal path which is completed by said section merging with a further section thereof having a relatively narrow, rounded U shaped cross-section internal path.

3. The apparatus of claim 1 wherein said confining elements consitute a roughly circular tray-like enclosure comprising a plate serving as a floor therefor, and a wall including a solid part containing said separate areas having openings in which are mounted said fluid dispersing jets, and a smaller grille part extending from said solid part to said passage of said fish impelling means, whereby deflected fluid carrying a fish is strained from said enclosure as said fish approaches said deflector element.

4. The apparatus of claim 1 wherein said passage of said fish impelling means is bounded above and below by upper and lower housings, respectively, and said mechanism therein comprises a separate set of holes in a bottom plate of said upper housing and in a top plate of said bottom housing, each set of holes being arranged in a number of rows, each having a plurality of holes, said plurality of holes in any one row being uniformly inclined with respect to a horizontal median plane through said passage, said inclination of any pair of adjacent rows of holes being substantially equal to each other, and each row of any said pair of adjacent rows being headed oppositely to each other and towards one of said vertically disposed openings of said passage.

5. The apparatus of claim 1 wherein said angle defined between said first passage opening vertical plane and said vertical deflector surface is approximately 60 degrees.

6. The apparatus of claim 1 wherein said elongated conduit structure is a channel element having generally straight upper and lower legs which merge with the respective upper and lower ends of said substantially arcuate section disposed in a vertical plane, said internal path in said upper and lower legs being open facing down and facing up, respectively, and said internal path being completed by a blending juncture of said internal paths of said upper and lower legs with said internal path in said arcuate section.

7. The apparatus of claim 6 wherein said channel comprises upper and lower end openings in said upper and lower legs, respectively, and said upper leg internal path varies in cross-section from a plane surface U-shape adjacent said upper end opening to a plane surface V-shape, said arcuate section internal path varies in cross-section from a plane surface V-shape to a slightly deeper plane surface V-shape, and said lower leg internal path varies in cross-section from a relatively broad substantially half-round shape to a relatively narrow round bottom U-shape adjacent to said lower end opening, whereby said fish in traversing the length of said internal path enters said channel at said upper end opening, slides within said channel in contact with a contoured surface defined by all said cross-section shapes, and leaves said channel at said lower end opening.

References Cited
UNITED STATES PATENTS

| | | | |
|---|---|---|---|
| 1,889,919 | 12/1932 | Hunt | 17—55 |
| 1,967,229 | 7/1934 | Drevitson | 17—55 |
| 2,938,229 | 5/1960 | Christie | 17—55 |
| 2,973,548 | 3/1961 | Walker | 17—55 |

ALDRICH F. MEDBERY, Primary Examiner

U.S. Cl. X.R.

302—14